US011199755B2

(12) United States Patent
Kakkar et al.

(10) Patent No.: US 11,199,755 B2
(45) Date of Patent: Dec. 14, 2021

(54) ILLUMINATION DEVICE WITH LIGHT GUIDE HAVING ANGLED LIGHT-ACCEPTING SURFACES

(71) Applicant: Lumileds LLC, San Jose, CA (US)

(72) Inventors: Varun Dev Kakkar, Eindhoven (NL); Arjen Van Der Sijde, Eindhoven (NL); Erno Fancsali, Heusden-Zolder (BE); Chunxia Feng, Shanghai (CN); Nicola Bettina Pfeffer, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/867,113

(22) Filed: May 5, 2020

(65) Prior Publication Data

US 2020/0264494 A1     Aug. 20, 2020

Related U.S. Application Data

(63) Continuation of application No. 16/071,784, filed as application No. PCT/EP2017/050770 on Jan. 16, 2017.

(30) Foreign Application Priority Data

Feb. 23, 2016   (EP) .................................. 16156952

(51) Int. Cl.
    *G03B 15/05*   (2006.01)
    *F21V 8/00*    (2006.01)
    *H04N 5/225*   (2006.01)

(52) U.S. Cl.
    CPC ............. *G03B 15/05* (2013.01); *G02B 6/003* (2013.01); *G02B 6/0018* (2013.01);
    (Continued)

(58) Field of Classification Search
    CPC ............ G03B 15/05; G03B 2215/0539; G03B 2215/0575; G03B 2215/0567;
    (Continued)

(56) References Cited

U.S. PATENT DOCUMENTS

2006/0039692 A1‡  2/2006  Lee ......................... G03B 15/05
                                                        396/19
2006/0209524 A1‡  9/2006  Tenmyo ............... G02B 6/0018
                                                        362/16

(Continued)

FOREIGN PATENT DOCUMENTS

CN       101743646 A      6/2010
CN       102402104 A      4/2012

(Continued)

OTHER PUBLICATIONS

US 11,003,051 B2, 05/2021, Kakkar et al. (withdrawn)

(Continued)

*Primary Examiner* — Kevin Quarterman
(74) *Attorney, Agent, or Firm* — Schwegman Lundberg & Woessner, P.A.

(57) ABSTRACT

A device includes a light-emitting device (LED) having at least two vertical light-emitting sides, and a ring-shaped light guide having a bottom side, a top side comprising a light-emitting surface, an inner sidewall, and an outer sidewall defining an indentation having at least two vertical in-coupling surfaces mated to the at least two vertical light-emitting sides of the LED.

20 Claims, 4 Drawing Sheets

(52) U.S. Cl.
CPC ......... *G02B 6/0038* (2013.01); *G02B 6/0073* (2013.01); *H04N 5/2256* (2013.01); *G03B 2215/0539* (2013.01); *G03B 2215/0567* (2013.01); *G03B 2215/0575* (2013.01); *G03B 2215/0582* (2013.01); *G03B 2215/0589* (2013.01)

(58) Field of Classification Search
CPC .... G03B 2215/0589; G03B 2215/0582; G02B 6/0038; G02B 6/0018; G02B 6/0073; G02B 6/003; H04N 5/2256
See application file for complete search history.

(56) References Cited

U.S. PATENT DOCUMENTS

| | | | |
|---|---|---|---|
| 2007/0159846 A1 ‡ | 7/2007 | Nishiyama | G01D 11/28 362/60 |
| 2011/0123184 A1 ‡ | 5/2011 | Mather | G03B 15/05 396/17 |
| 2012/0321290 A1 ‡ | 12/2012 | Daijo | G02B 6/0018 396/20 |
| 2014/0209796 A1 | 7/2014 | Ishii et al. | |
| 2014/0211446 A1 ‡ | 7/2014 | Tenmyo | G03B 15/05 362/11 |
| 2019/0033688 A1 | 1/2019 | Kakkar et al. | |

FOREIGN PATENT DOCUMENTS

| | | | | |
|---|---|---|---|---|
| CN | 102822739 | A | 12/2012 | |
| CN | 203773211 | U | 8/2014 | |
| EP | 2947960 | A1 | 11/2015 | |
| EP | 14741012.0 | A1 ‡ | 11/2015 | |
| JP | 2004288584 | A | 10/2004 | |
| JP | 2006302743 | A | 11/2006 | |
| JP | 2008097976 | A | 4/2008 | |
| JP | 2009237298 | A | 10/2009 | |
| JP | 2009267318 | A | 11/2009 | |
| JP | 2011118383 | A | 6/2011 | |
| JP | 2011247978 | A | 12/2011 | |
| JP | 2012212532 | A | 11/2012 | |
| KR | 20180104680 | A | 9/2018 | |
| WO | WO-2008/152610 | A2 ‡ | 12/2008 | ........... G02B 6/0073 |
| WO | WO-2008152610 | A2 | 12/2008 | |
| WO | WO-2012/042436 | A1 ‡ | 4/2012 | ......... G02B 19/0028 |
| WO | WO-2012042436 | A1 | 4/2012 | |
| WO | WO-2014112379 | A1 | 7/2014 | |
| WO | WO-2017125337 | ‡ | 7/2017 | |
| WO | WO-2017125337 | A1 | 7/2017 | |

OTHER PUBLICATIONS

"International Application Serial No. PCT/EP2017/050770, International Search Report dated Mar. 31, 2017", 4 pgs.‡

"International Application Serial No. PCT/EP2017/050770, Written Opinion dated Mar. 31, 2017", 6 pgs.‡

"International Application Serial No. PCT/EP2017/050770, International Preliminary Report on Patentability dated Aug. 2, 2018", 8 pgs.‡

"U.S. Appl. No. 16/071,784, Non Final Office Action dated Jun. 20, 2019", 9 pgs.

"U.S. Appl. No. 16/071,784, Notice of Allowance dated Jan. 28, 2020", 9 pgs.

"U.S. Appl. No. 16/071,784, Notice of Allowance dated Oct. 4, 2019", 9 pgs.

"U.S. Appl. No. 16/071,784, Preliminary Amendment filed Jul. 20, 2018", 8 pgs.

"U.S. Appl. No. 16/071,784, PTO Response to 312 Communication dated Feb. 13, 2020", 2 pgs.

"U.S. Appl. No. 16/071,784, Response filed Sep. 20, 2019 to Non-Final Office Action dated Jun. 20, 2019", 13 pgs.

"Chinese Application Serial No. 201780007619.7, Office Action dated Jan. 13, 2021", w/English Translation, 9 pgs.

"U.S. Appl. No. 16/071,784, Notice of Allowance dated Jun. 11, 2021", 9 pgs.

"Chinese Application Serial No. 201780007619.7, Response filed Mar. 16, 2021 to Office Action dated Jan. 13, 2021", w/English Claims, 31 pgs.

"Chinese Application Serial No. 201780007619.7, Response filed Sep. 30, 2020 to Office Action dated Jun. 2, 2020", (w/ English Translation), 12 pgs.

"European Application Serial No. 17701080.8, Communication under Rule 71(3) EPC dated Jul. 28, 2021", 18 pgs.

"European Application Serial No. 17701080.8, Response filed May 18, 2021 to Summons to Attend Oral Proceedings mailed Jan. 26, 2021", 11 pgs.

"European Application Serial No. 17701080.8, Result of Consultation mailed Jun. 10, 2021", 3 pgs.

‡ imported from a related application

ILLUMINATION DEVICE WITH LIGHT GUIDE HAVING ANGLED LIGHT-ACCEPTING SURFACES

CROSS REFERENCE TO RELATED APPLICATIONS

This application is a continuation of and claims priority to U.S. patent application Ser. No. 16/071,784, filed Jul. 20, 2018, which claims priority of International Patent Application No. PCT/EP2017/050770, filed Jan. 16, 2017, and International Patent Application No. PCT/CN2016/071584, filed Jan. 21, 2016, and European Patent Application Serial No. 16156952.0, filed Feb. 23, 2016, the disclosures of which are incorporated herein in their entireties by reference.

FIELD OF THE INVENTION

The present disclosure relates to a light-emitting diodes or devices (LEDs) powered light guide, and more particular to an LED powered ring flash for a camera.

BACKGROUND

A camera flash helps a camera to capture a good quality picture in low light scenes. A camera flash located on one side of a camera lens is likely to create shadows on a subject, especially for a macrophotography when the subject is very close to the lens. A ring flash is a circular photographic flash that fits around the lens for use in macrophotography. The ring flash provides uniform illumination with few shadows visible in the photograph, as the origin of the light is very close to and surrounds the optical axis of the lens.

SUMMARY

In one or more examples of the present disclosure, a device includes a light-emitting diode or device (LED) having at least two vertical light-emitting sides, and a ring-shaped light guide having a bottom side, a top side comprising a light-emitting surface, an inner sidewall, and an outer sidewall defining an indentation having at least two vertical in-coupling surfaces mated to the at least two vertical light-emitting sides of the LED.

BRIEF DESCRIPTION OF THE DRAWINGS

In the drawings.

Use of the same reference numbers in different figures indicates similar or identical elements.

DETAILED DESCRIPTION

A mobile device, such as a camera phone, may include a ring flash. The ring flash may operate continuously in a flashlight mode or during the recording of a video.

A ring flash may use individual light-emitting diodes or devices (LEDs) with simple transmission optics as its light source. The LEDs generate hot spots so the light-emitting surface does not provide uniform illumination, especially in camera phone applications when the ring flash is small or operates continuously.

Figure 1:
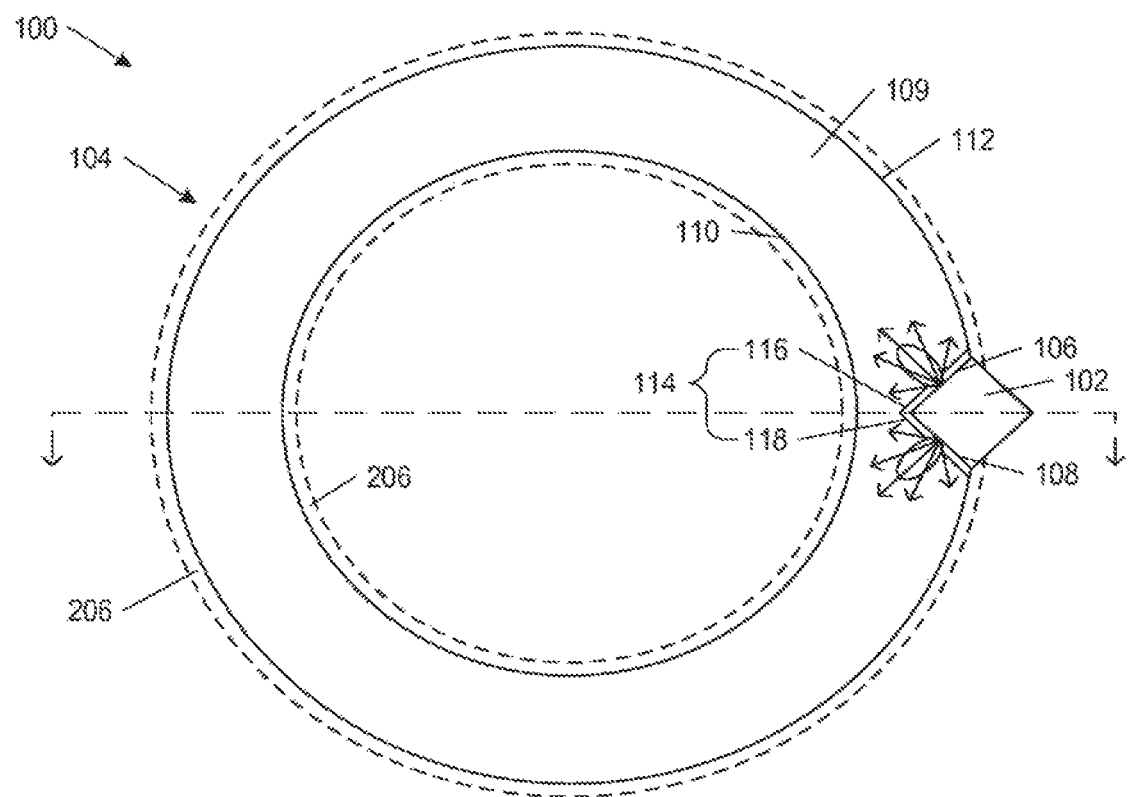
FIG. 1 shows a top view of a light guide module in examples of the present disclosure.
Figure 2:
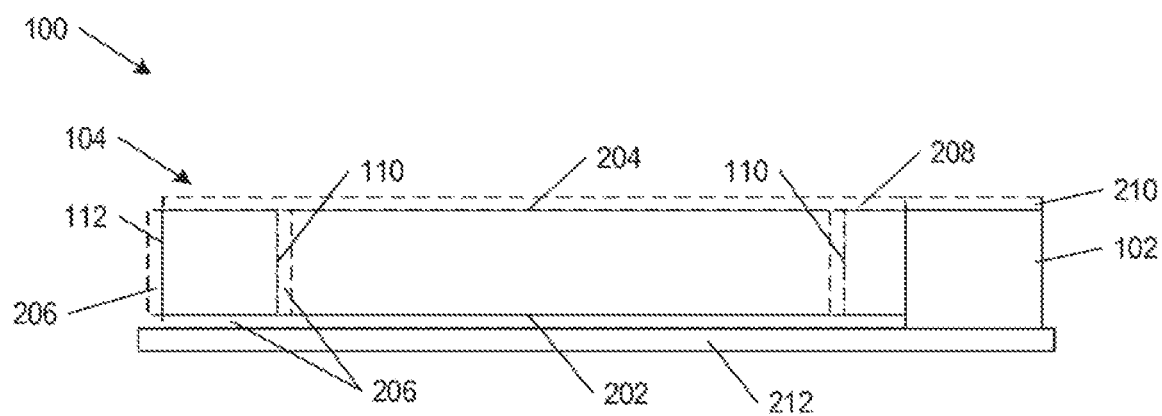
FIG. 2 shows a cross-sectional view of the light guide module of FIG. 1 in examples of the present disclosure.

FIGS. 1 and 2 show top and cross-section views of a light guide module 100 in examples of the present disclosure. Light guide module 100 includes a light-emitting diode or device (LED) 102 and a ring-shaped light guide 104. LED 102 has two vertical light-emitting sides 106 and 108. LED 102 may have the shape of a rectangular cuboid.

Light guide 104 has a body 109 with a circular inner sidewall 110, a circular outer sidewall 112, an annular bottom side 202 (FIG. 2), and an annular top side 204 (FIG. 2). Top side 204 is a light-emitting surface. Outer sidewall 112 defines an opening or indentation 114 having two vertical in-coupling surfaces 116 and 118, which are mated to respective light-emitting sides 106 and 108 of LED 102. Light guide body 109 may be made by injection molding using material such as polymethyl methacrylate (PMMA).

From in-coupling surfaces 116 and 118, light travels around light guide body 109 by total internal reflection (TIR). Light guide 104 may include a reflector film 206 fixed on inner wall 110, outer wall 112, and bottom side 202 to help light travel around light guide body 109. Light guide 104 may include a diffuser or collimating film 208 fixed on top side 204 to achieve a uniform and vectored or collimated emission.

A white ink pattern 210 (FIG. 2) may be printed on a top side of LED 102 to hide the LED from view.

Light guide module 100 may further include a printed circuit board (PCB) 212 (FIG. 2). LED 102 and light guide 104 are mounted on PCB 212. PCB 212 has pads for mounting LED 102 and traces coupling the pads to other components on or off the board. PCB 212 also mechanically supports LED 102 and light guide 104.

Figure 3:
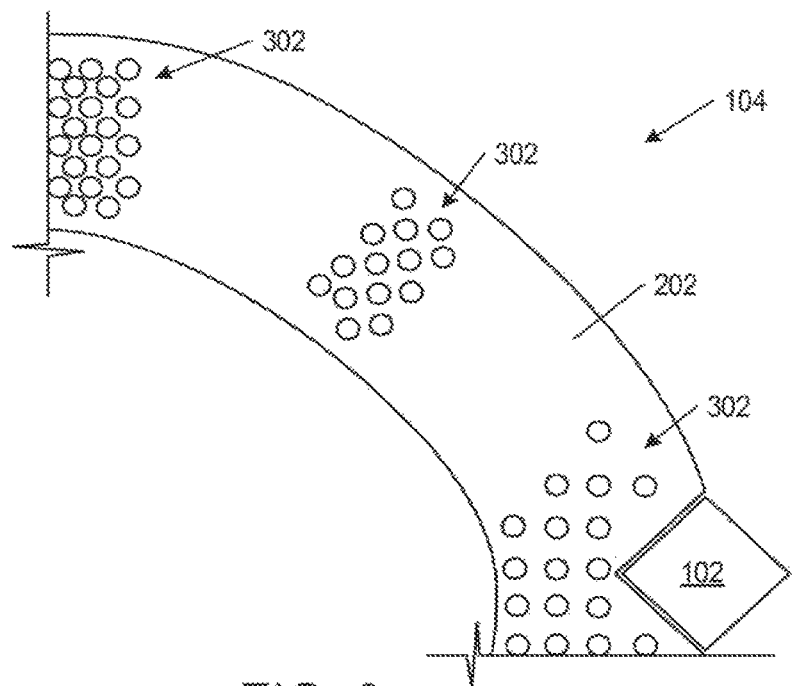
FIG. 3 shows a bottom view of a portion of the light guide of FIGS. 1 and 2 in examples of the present disclosure.

FIG. 3 shows a bottom view of a portion of light guide 104 in examples of the present disclosure. Light guide 104 includes white ink dots 302 printed on bottom side 202 in order to extract light from the light guide through top side 204 (FIG. 2). The density of ink dots 302 increases as they move away from LED 102 to ensure uniform illumination over the entire top side 204. Instead of white ink dots, bottom side 202 may be textured by molding or machining to create protrusions or indentations 302 in order to extract light from light guide 104 through top side 204. This may be enhanced by adding a reflector film 206 that conforms to bottom side 202, especially the contour of features 302. For example, reflector film 206 may be deposited or laminated to bottom side 202.

Figure 4:
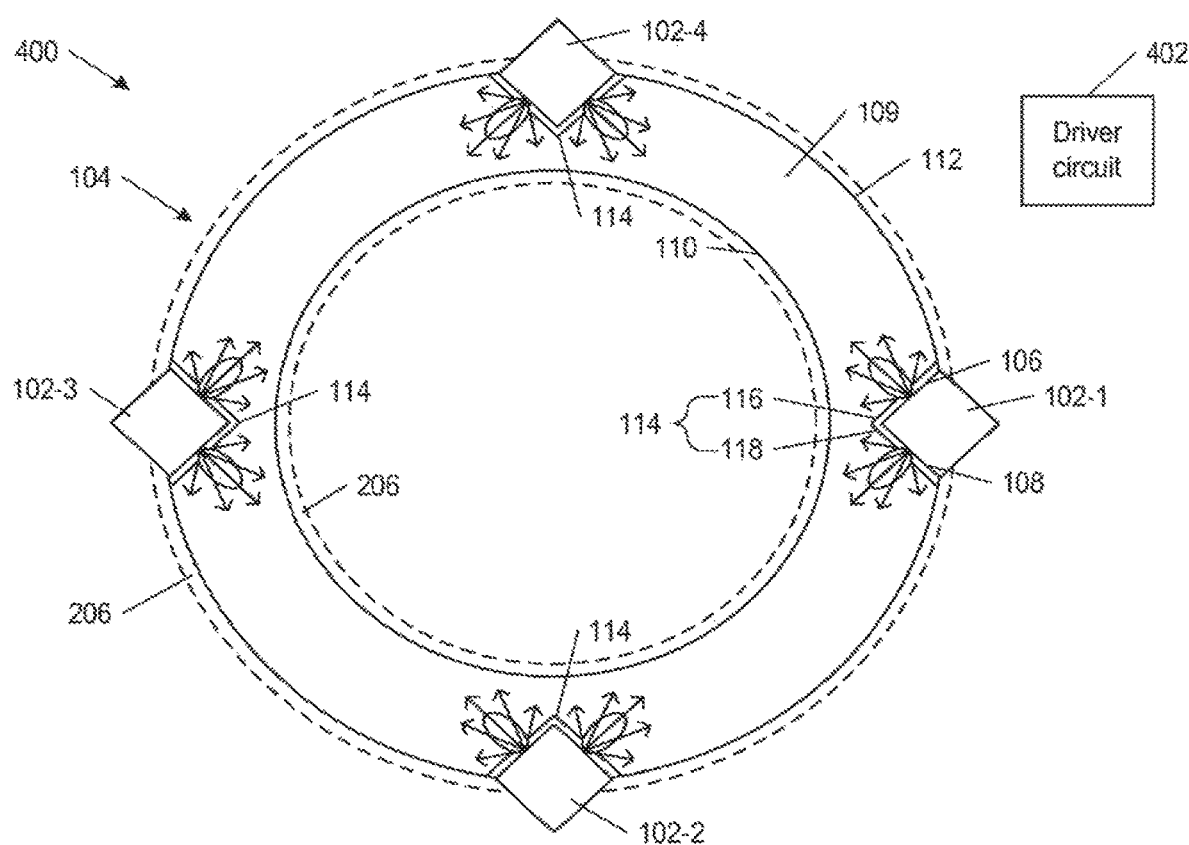
FIG. 4 shows a top view of another light guide module in examples of the present disclosure.

FIG. 4 shows a top view of a light guide module 400 in examples of the present disclosure. Light guide module 400 is similar to light guide module 100 except it includes multiple LEDs, such as LEDs 102-1, 102-2, 102-3, and 102-4 (collectively as "LEDs 102"), and outer sidewall 112 of light guide body 109 now defines multiple openings or indentations 114 to receive the LEDs. LEDs 102 may have different wavelengths so a driver circuit 402 may drive them in different combinations or at different settings (e.g., current frequencies or magnitudes) to create a desired color (e.g., a white color point). Alternatively, driver circuit 402 may selectively (e.g., sequentially) drive LEDs 102 to create an animated effect. Driver circuit 402 may be a component mounted on PCB 212 (FIG. 2) and connected by traces to LEDs 102.

Figure 5:
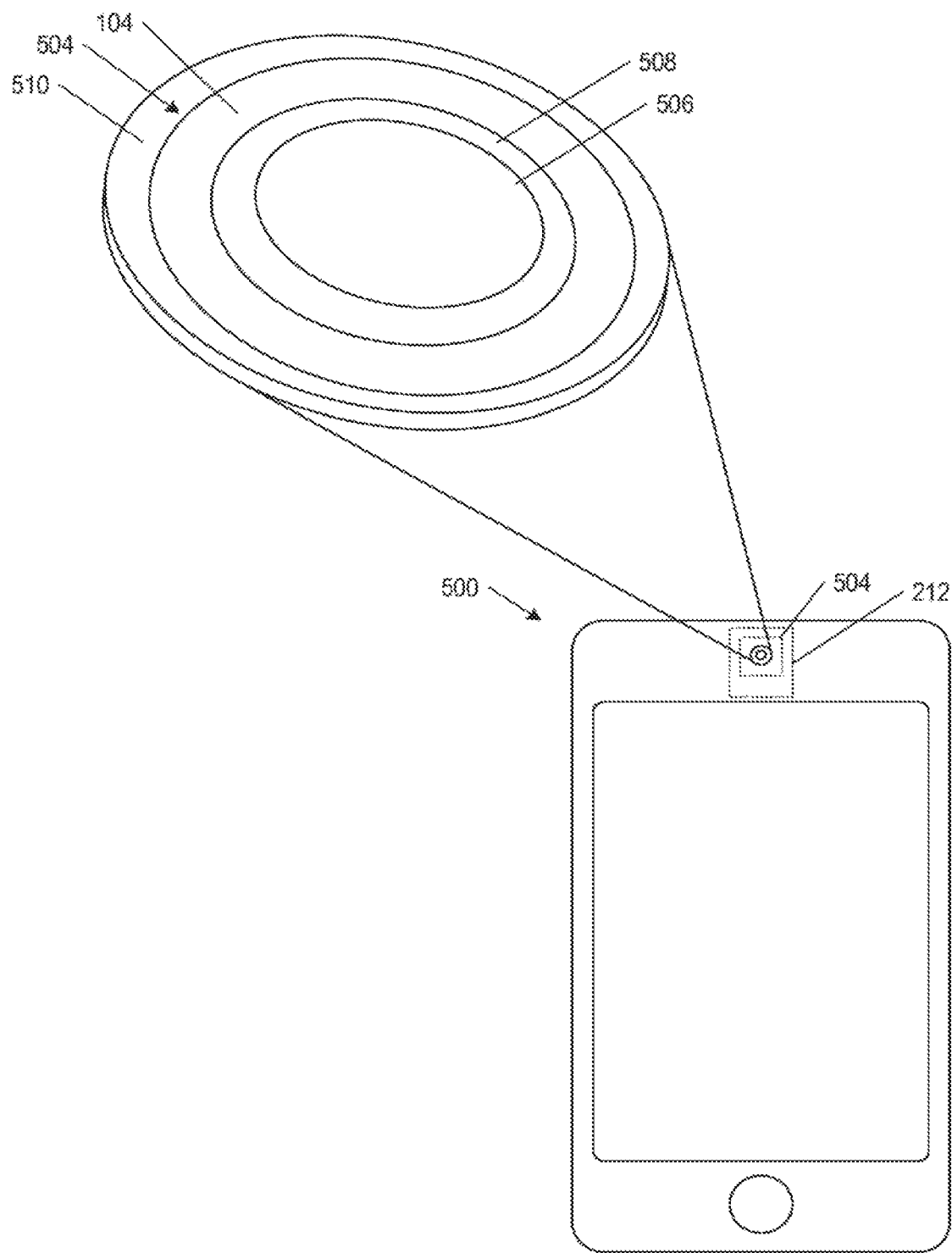
FIG. 5 shows a device fitted with the light guide module of FIG. 1 or 4 in examples of the present disclosure.

FIG. 5 shows a device 500 fitted with a light guide module 502 in examples of the present disclosure. Light guide module 502 may be light guide module 100 or 400. Device 500 may be a camera phone with a camera module 504 having a lens 506 in examples of the present disclosure. Ring-shaped light guide 104 is fitted around lens 506 or a bezel 508 of the lens. Device 500 may include a bezel 510 around ring-shaped light guide 104 of light guide module 502.

Figure 6:
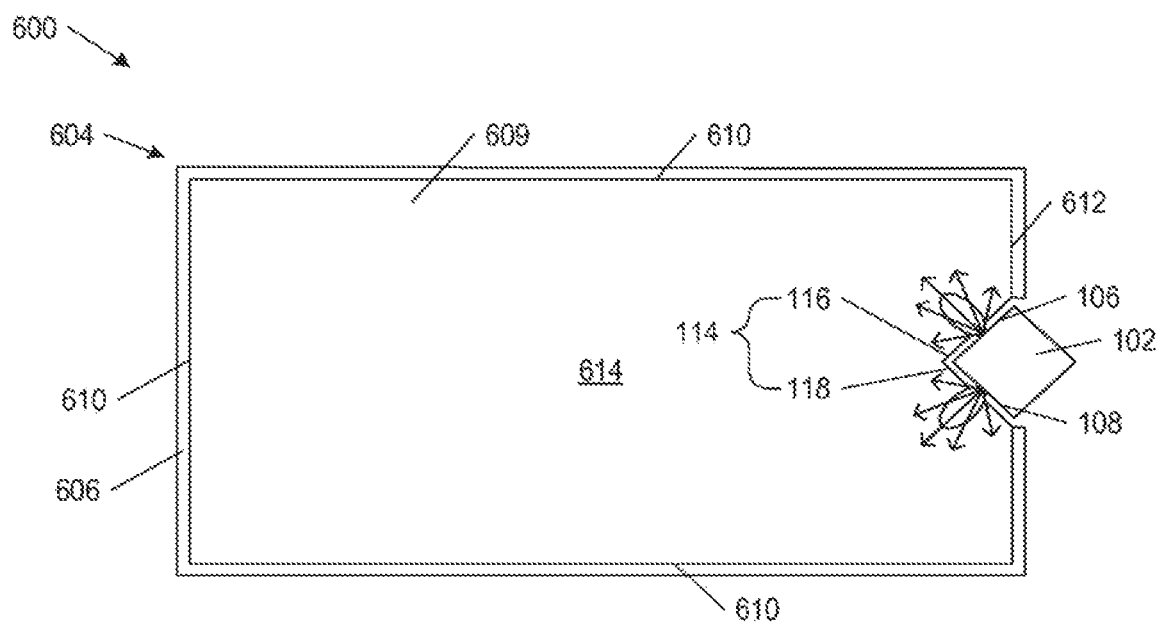
FIG. 6 shows a light guide module in examples of the present disclosure.

Although a ring-shaped light guide 104 has been described, the principles of the present disclosure may be applied to light guides of other shapes. FIG. 6 shows a light guide module 600 in examples of the present disclosure. Light guide module 600 is similar to light guide module 100 and 400 except it has a rectangular light guide 604. Light guide 604 has a body 609 that is a rectangular cuboid with sidewalls 610, a sidewall 612, a bottom side (not visible), and a top side 614. Top side 614 is a light-emitting surface. Sidewall 612 defines an opening or indentation 114 having two vertical in-coupling surfaces 116 and 118, which are mated to respective light-emitting sides 106 and 108 of LED 102. Light guide 604 may include reflector film 206 fixed on sidewalls 610, sidewall 612, and the bottom side (not visible). Light guide 604 may include a diffuser or collimating film (not shown) fixed on top side 614.

Figure 7:
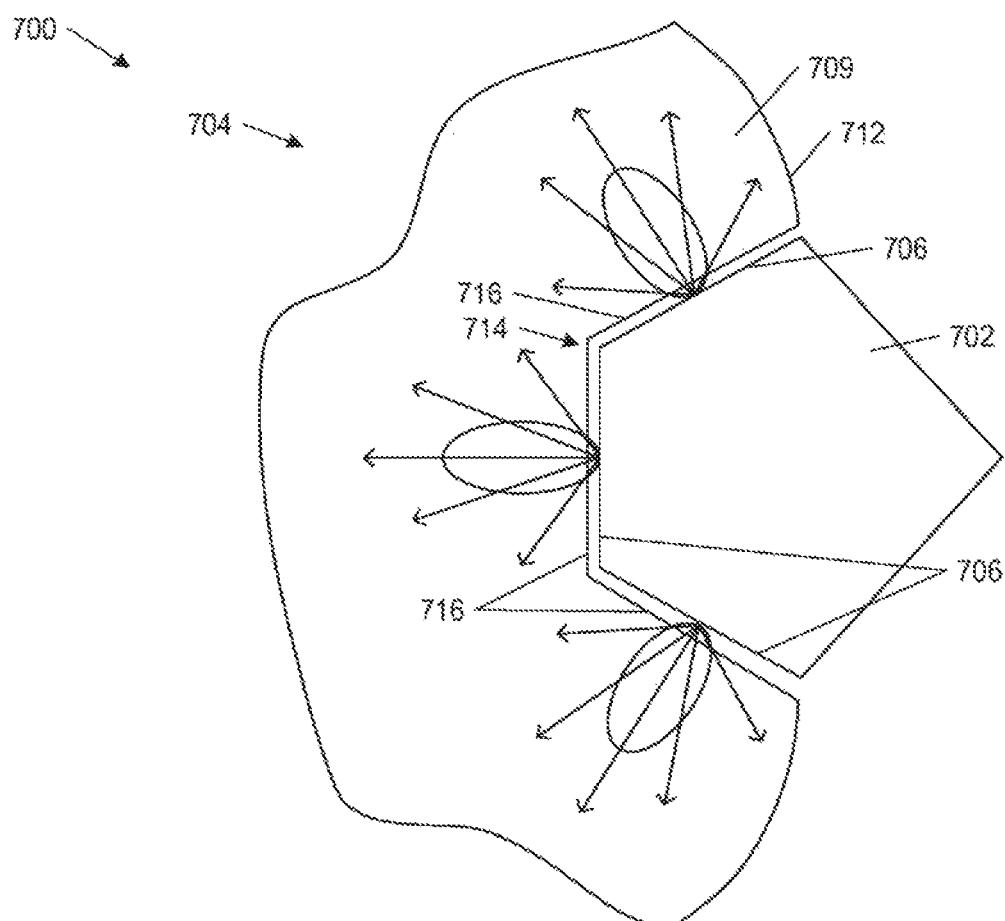
FIG. 7 shows a partial top view of a light guide module in examples of the present disclosure.

Although a rectangular cuboid LED 102 with two vertical light-emitting sides 106 and 108 has been described, the principles of the present disclosure may be applied to LEDs off other shapes having more than two vertical light-emitting sides. FIG. 7 shows a partial top view of a light guide module 700 in examples of the present disclosure. Light guide module 700 is similar to light guide module 100, 400, and 700 except it has an LED 702 with three vertical light-emitting sides 706. A light guide 704 has a body 709 with a sidewall 712 defines an opening or indentation 714 having three vertical in-coupling surfaces 716, which are mated to respective light-emitting sides 706 of LED 702.

Various other adaptations and combinations of features of the embodiments disclosed are within the scope of the invention. Numerous embodiments are encompassed by the following claims.

What is claimed:

1. An illumination device, comprising:
a light-emitting diode having a planar first light-producing surface configured to produce first light and a planar second light-producing surface configured to produce second light,
the second light-producing surface being adjacent to the first light-producing surface and angled with respect to the first light-producing surface; and
a light guide shaped to guide light along a closed path that defines opposing first and second directions around the light guide,
the light guide having a planar first light-accepting surface positioned to receive the first light and direct the first light into the light guide to propagate in the first direction around the light guide,
the light guide having a planar second light-accepting surface positioned to receive the second light and direct the second light into the light guide to propagate in the second direction around the light guide,
the second light-accepting surface being adjacent to the first light-accepting surface and angled with respect to the first light-accepting surface,
the light guide having a planar light-emitting surface configured to extract at least some of the guided first light and at least some of the guided second light out of the light guide through the light-emitting surface,
the light-emitting surface being angled with respect to the first light-accepting surface and angled with respect to the second light-accepting surface.

2. The illumination device of claim 1, wherein:
the first light-producing surface of the light-emitting diode is positioned directly adjacent to the first light-accepting surface of the light guide without optical elements therebetween; and
the second light-producing surface of the light-emitting diode is positioned directly adjacent to the second light-accepting surface of the light guide without optical elements therebetween.

3. The illumination device of claim 1, wherein:
the first light-producing surface of the light-emitting diode is generally parallel to the first light-accepting surface of the light guide; and
the second light-producing surface of the light-emitting diode is generally parallel to the second light-accepting surface of the light guide.

4. The illumination device of claim 1, wherein the light guide has a cross-section that is generally rectangular, the cross-section being taken in a plane that passes through a center of the light guide and is substantially orthogonal to the light-emitting surface.

5. The illumination device of claim 1, wherein:
the light-emitting diode is shaped as a rectangular cuboid;
the first light-producing surface of the light-emitting diode is substantially orthogonal to the second light-producing surface of the light-emitting diode; and
the first light-accepting surface of the light guide is substantially orthogonal to the second light-accepting surface of the light guide.

6. The illumination device of claim 1, wherein:
the light guide further includes a third light-accepting surface that is generally planar and angled with respect to the light-emitting surface, the third light-accepting surface being adjacent to the second light-accepting surface and angled with respect to the second light-accepting surface; and
the light-emitting diode has a third light-producing surface that is generally planar and positioned to face the third light-accepting surface of the light guide.

7. The illumination device of claim 6, wherein:
the third light-producing surface of the light-emitting diode is positioned directly adjacent to the third light-accepting surface of the light guide without optical elements therebetween; and
the third light-producing surface of the light-emitting diode is generally parallel to the third light-accepting surface of the light guide.

8. The illumination device of claim 1, wherein the first light-accepting surface and the second light-accepting surface extend from an outer diameter of the light guide and extend only partially toward an inner diameter of the light guide.

9. The illumination device of claim 1, further comprising a second light-emitting diode having a planar third light-producing surface configured to produce third light and a planar fourth light-producing surface configured to produce fourth light, the fourth light-producing surface being adjacent to the third light-producing surface and angled with respect to the third light-producing surface, wherein:

the light guide has a planar third light-accepting surface positioned to receive the third light and direct the third light into the light guide to propagate in the first direction around the light guide;

the light guide has a planar fourth light-accepting surface positioned to receive the fourth light and direct the fourth light into the light guide to propagate in the second direction around the light guide;

the fourth light-accepting surface is adjacent to the third light-accepting surface and angled with respect to the third light-accepting surface;

the light-emitting surface is further configured to extract at least some of the guided third light and at least some of the guided fourth light out of the light guide through the light-emitting surface; and the light-emitting surface is angled with respect to the third light-accepting surface and angled with respect to the fourth light-accepting surface.

10. The illumination device of claim 9, wherein the light-emitting diode and the second light-emitting diode are configured to emit light having different wavelengths.

11. The illumination device of claim 10, further comprising a driver configured to drive the first light-emitting diode and the second light-emitting diode at different settings to tune a white color point for a mixture of light produced by the first light-emitting diode and the second light-emitting diode.

12. The illumination device of claim 1, further comprising a printed circuit board electrically coupled to the light-emitting diode, wherein the light-emitting diode and the light guide are mounted on the printed circuit board.

13. The illumination device of claim 1, wherein the light guide further includes an opposing surface positioned opposite the light-emitting surface, the opposing surface being textured, the texturing configured to enhance emission of the guided light through the light-emitting surface.

14. The illumination device of claim 1, wherein the light guide further includes an opposing surface positioned opposite the light-emitting surface, the opposing surface comprising dots that are configured to enhance emission of the guided light through the light-emitting surface.

15. The illumination device of claim 1, further comprising a reflector film positioned on the light guide away from the light-emitting surface.

16. The illumination device of claim 1, further comprising a diffuser film positioned on the light-emitting surface.

17. The illumination device of claim 1, further comprising a pattern positioned on the light-emitting diode on a side of the light-emitting diode that faces the light-emitting surface of the light guide, the pattern configured to obscure the light-emitting diode.

18. A method for producing an illumination device, the method comprising:

providing a light guide,
the light guide configured to guide light in a closed path as guided light,
the closed path defining a plane,
the light guide including a light-emitting surface that is generally planar, substantially parallel to the plane, and configured to emit at least a portion of the guided light,
the light guide further including a first light-accepting surface that is generally planar and angled with respect to the light-emitting surface,
the light guide further including a second light-accepting surface that is generally planar and angled with respect to the light-emitting surface, the second light-accepting surface being adjacent to the first light-accepting surface and angled with respect to the first light-accepting surface; and positioning a light-emitting diode proximate the light guide,
the light-emitting diode including a planar first light-producing surface positioned to emit light into the light guide through the first light-accepting surface of the light guide,
the light-emitting diode including a planar second light-producing surface positioned to emit light into the light guide through the second light-accepting surface of the light guide.

19. A method for producing illumination from a light guide, the light guide shaped to guide light along a closed path, the closed path defining opposing first and second directions around the light guide, the method comprising:

producing first light at a planar first light-producing surface of a light-emitting diode;
directing the first light through a first light-accepting surface of a light guide;
guiding the first light in the first direction around the light guide;
producing second light at a planar second light-producing surface of the light-emitting diode, the second light-producing surface being adjacent to the first light-producing surface and angled with respect to the first light-producing surface;
directing the second light through a second light-accepting surface of a light guide, the second light-accepting surface being adjacent to the first light-accepting surface and angled with respect to the first light-accepting surface; and
guiding the second light in the second direction around the light guide.

20. The method of claim 19, further comprising:
extracting at least some of the first light and at least some of the second light out of the light guide through a light-emitting surface of the light guide,
the light-emitting surface of the light guide being generally planar,
the light-emitting surface of the light guide being angled with respect to the first light-accepting surface of the light guide,
the light-emitting surface of the light guide being angled with respect to the second light-accepting surface of the light guide.

* * * * *

UNITED STATES PATENT AND TRADEMARK OFFICE
CERTIFICATE OF CORRECTION

PATENT NO. : 11,199,755 B2  
APPLICATION NO. : 16/867113  
DATED : December 14, 2021  
INVENTOR(S) : Kakkar et al.

Page 1 of 1

It is certified that error appears in the above-identified patent and that said Letters Patent is hereby corrected as shown below:

On the Title Page

In item (30), in "Foreign Application Priority Data", in Column 1, Line 1, after "16156952", insert --¶Jan. 21, 2016 (CN) PCT/CN2016/071584--

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*